(12) United States Patent
Warmenhoven

(10) Patent No.: US 11,979,378 B2
(45) Date of Patent: *May 7, 2024

(54) MANAGING DATA COMMUNICATION IN A VIRTUAL PRIVATE NETWORK

(71) Applicant: UAB 360 IT, Vilnius (LT)

(72) Inventor: Adrianus Warmenhoven, Overijssel (NL)

(73) Assignee: UAB 360 IT, Vilnius (LT)

( * ) Notice: Subject to any disclaimer, the term of this patent is extended or adjusted under 35 U.S.C. 154(b) by 45 days.

This patent is subject to a terminal disclaimer.

(21) Appl. No.: 17/691,086

(22) Filed: Mar. 9, 2022

(65) Prior Publication Data

US 2023/0291663 A1    Sep. 14, 2023

Related U.S. Application Data

(63) Continuation of application No. 17/689,919, filed on Mar. 8, 2022, now Pat. No. 11,425,099.

(51) Int. Cl.
*H04L 9/40* (2022.01)
*H04L 43/028* (2022.01)
(Continued)

(52) U.S. Cl.
CPC ........ *H04L 63/0272* (2013.01); *H04L 43/028* (2013.01); *H04L 43/065* (2013.01);
(Continued)

(58) Field of Classification Search
None
See application file for complete search history.

(56) References Cited

U.S. PATENT DOCUMENTS 9,088,508 B1 * 7/2015 Caputo, II .......... H04L 63/1425
10,122,606 B1 * 11/2018 Korhonen ............... H04L 43/08
(Continued)

FOREIGN PATENT DOCUMENTS

EP     3767894 A1 *  1/2021   ......... H04L 12/4641

OTHER PUBLICATIONS

Waskita et al., "A Simple Statistical Analysis Approach for Intrusion Detection System", 2013 IEEE Conference on Systems, Process & Control (ICSPC2013), Dec. 13-15, 2013, IEEE 978-1-4799-2209-3/13, (Year: 2013).*

(Continued)

*Primary Examiner* — Piotr Poltorak
(74) *Attorney, Agent, or Firm* — The Pattani Law Group

(57) ABSTRACT

A method including determining, by a virtual private network (VPN) server providing VPN services to one or more user devices, an average threshold level associated with an aggregate amount of VPN data communicated with a host device during a reference period; determining, by the VPN server, an observed average aggregate amount of VPN data communicated with the host device during an operation period; comparing, by the VPN server, the observed average aggregate amount with the average threshold level; and selectively transmitting, by the VPN server, a notification to the one or more devices indicating that the one or more user devices is to manage transmission of data from the one or more user devices based at least in part on a result of comparing the observed average aggregate amount with the average threshold level. Various other aspects are contemplated.

20 Claims, 8 Drawing Sheets

(51) Int. Cl.
  *H04L 43/065* (2022.01)
  *H04L 43/067* (2022.01)
(52) U.S. Cl.
  CPC ........ *H04L 43/067* (2013.01); *H04L 63/0236* (2013.01); *H04L 63/0876* (2013.01)

(56) References Cited

U.S. PATENT DOCUMENTS

| | | | |
|---|---|---|---|
| 2001/0021176 A1* | 9/2001 | Mimura | H04L 43/065 370/235 |
| 2002/0101919 A1* | 8/2002 | Takada | H04L 47/36 375/225 |
| 2006/0041667 A1* | 2/2006 | Ahn | H04L 63/1458 709/229 |
| 2008/0028467 A1* | 1/2008 | Kommareddy | H04L 63/1458 726/23 |
| 2010/0050084 A1* | 2/2010 | Knapp | H04L 12/18 715/736 |
| 2014/0359159 A1* | 12/2014 | Diaz-Cuellar | H04L 63/0272 709/235 |
| 2015/0039757 A1* | 2/2015 | Petersen | H04L 63/0227 709/224 |
| 2016/0359889 A1* | 12/2016 | Yadav | G06N 20/00 |
| 2017/0142144 A1* | 5/2017 | Weinberger | H04L 63/1408 |
| 2017/0295083 A1* | 10/2017 | Brooks | H04L 43/067 |
| 2017/0295191 A1* | 10/2017 | Choi | H04L 67/1014 |
| 2018/0077180 A1* | 3/2018 | Zhang | G06N 3/084 |
| 2018/0278638 A1* | 9/2018 | Zheng | H04L 63/1458 |
| 2018/0307712 A1* | 10/2018 | Baradaran | G06F 16/217 |
| 2020/0322237 A1* | 10/2020 | Luo | H04L 43/045 |
| 2020/0410418 A1* | 12/2020 | Martynov | G06F 16/122 |
| 2021/0184780 A1* | 6/2021 | Yang | H04L 45/54 |
| 2022/0272047 A1* | 8/2022 | Dang | H04L 47/6255 |

OTHER PUBLICATIONS

Rahul et al., "Detection of Intruders and Flooding In Voip Using IDS, Jacobson Fast And Hellinger Distance Algorithms", IOSR Journal of Computer Engineering (IOSRJCE) ISSN: 2278-0661 vol. 2, Issue 2 (Jul.-Aug. 2012), pp. 30-36, (Year: 2012).*

Tajer et al., "A comparison between divergence measures for network anomaly detection," 2011 7th International Conference on Network and Service Management, Paris, France, 2011 (Year: 2011).*

Ahmed et al., "Novel Approach for Network Traffic Pattern Analysis using Clustering-based Collective Anomaly Detection", Ann. Data. Sci. (2015) 2(1):111-130, DOI 10.1007/s40745-015-0035-y (Year: 2015).*

Gho et al., "Towards Intrusion Detection for Encrypted Networks", IEEE 978-0-7695-3564-7/09 (Year: 2009).*

Waskita et al., "A Simple Statistical Analysis Approach for Intrusion Detection System", 2013 IEEE Conference on Systems, Process & Control (ICSPC2013), Dec. 13-15, 2013, Kuala Lumpur, Malaysia. (Year: 2013).

* cited by examiner

MANAGING DATA COMMUNICATION IN A VIRTUAL PRIVATE NETWORK

CROSS REFERENCE

This application is a continuation of U.S. Non-Provisional patent application Ser. No. 17/689,919, filed on Mar. 8, 2022, and titled "Managing Data Communication In A Virtual Private Network," the entire contents of which are incorporated herein by reference.

FIELD OF DISCLOSURE

Aspects of the present disclosure generally relate to a virtual private network (VPN), and more particularly to managing data communication in a VPN.

BACKGROUND

Global Internet users increasingly rely on VPN services to preserve their privacy, to circumvent censorship, and/or to access geo-filtered content. Originally developed as a technology to privately send and receive data across public networks, VPNs are now used broadly as a privacy-preserving technology that allows Internet users to obscure not only the communicated data but also personal information such as, for example, web browsing history from third parties including Internet service providers (ISPs), Spywares, or the like. A VPN service provider may offer a secure private networking environment within a publicly shared, insecure infrastructure through encapsulation and encryption of the data communicated between a VPN client application (or VPN application) installed on a user device and a remote VPN server.

Most VPN providers rely on a tunneling protocol to create the secure private networking environment, which adds a layer of security to protect each IP packet of the communicated data during communication over the Internet. Tunneling may be associated with enclosing an entire IP packet within an outer IP packet to form an encapsulated IP packet, and transporting the enclosed IP packet over the Internet. The outer IP packet may protect contents of the enclosed IP packet from public view by ensuring that the enclosed IP packet is transmitted over the Internet within a virtual tunnel. Such a virtual tunnel may be a point-to-point tunnel established between the user device and the VPN server. The process of enclosing the entire IP packet within the outer IP packet may be referred to as encapsulation. Computers, servers, or other network devices at ends of the virtual tunnel may be referred to as tunnel interfaces and may be capable of encapsulating outgoing IP packets and of unwrapping incoming encapsulated IP packets.

Encryption may be associated with changing the data from being in a transparently readable format to being in an encoded, unreadable format with the help of an encryption algorithm. Decryption may be associated with changing the data from being in the encoded, unreadable format to being in the transparently readable format with the help of a decryption algorithm. In an example, encoded/encrypted data may be decoded/decrypted with only a correct decryption key. In a VPN, encryption may render the communicated data unreadable or indecipherable to any third party. At a basic level, when the user launches the installed VPN application and connects to the VPN server, the VPN application may encrypt all contents of the data before transmission over the Internet to the VPN server. Upon receipt, the VPN server may decrypt the encrypted data and forward the decrypted data to an intended target via the Internet. Similarly, the VPN server may encrypt all contents of the data before transmission over the Internet to the user device. Upon receipt, the VPN application on the user device may decrypt the encrypted data and provide the decrypted data to the user.

VPNs generally use different types of encryption and decryption algorithms to encrypt and decrypt the communicated data. Symmetric encryption may utilize encryption and decryption algorithms that rely on a single private key for encryption and decryption of data. Symmetric encryption is considered to be relatively speedy. One example of an encryption and decryption algorithm utilized by symmetric encryption may be an AES encryption cipher. Asymmetric encryption, on the other hand, may utilize encryption and decryption algorithms that rely on two separate but mathematically-related keys for encryption and decryption of data. In one example, data encrypted using a public key may be decrypted using a separate but mathematically-related private key. The public key may be publicly available through a directory, while the private key may remain confidential and accessible by only an owner of the private key. Asymmetric encryption may also be referred to as public key cryptography. One example of an encryption and decryption algorithm utilized by asymmetric encryption may be Rivest-Shamir-Adleman (RSA) protocol.

In a VPN, keys for encryption and decryption may be randomly generated strings of bits. Each key may be generated to be unique. A length of an encryption key may be given by a number of the randomly generated string bits, and the longer the length of the encryption key, the stronger the encryption is.

VPNs may employ user authentication, which may involve verification of credentials required to confirm authenticity/identity of the user. For instance, when a user launches the VPN application to request a VPN connection, the VPN service provider may authenticate the user device prior to providing the user device with access to VPN services. In this way, user authentication may provide a form of access control. Typically, user authentication may include verification of a unique combination of a user ID and password. To provide improved security in the VPN, user authentication may include additional factors such as knowledge, possession, inheritance, or the like. Knowledge factors may include items (e.g., pin numbers) that an authentic user may be expected to know. Possession factors may include items (e.g., one-time password (OTP) tokens) that an authentic user may be expected to possess at a time associated with the authentication. Inherent factors may include biometric items (e.g., fingerprint scans, retina scans, iris scans, or the like) that may be inherent traits of an authentic user.

A VPN may be associated with a network of VPN servers, typically deployed in various geographic locations. A VPN server may be a physical server or a virtual server configured to host and/or globally deliver VPN services to the user. A server may be a combination of hardware and software, and may include logical and physical communication ports. When launched, the VPN application may connect with a selected VPN server for secure communication of data via the virtual tunnel.

The VPN application, installed on the user device, may utilize software-based technology to establish a secure connection between the user device and a VPN server. Some VPN applications may automatically work in the background on the user device while other VPN applications may include front-end interfaces to allow the user to interact with and configure the VPN applications. VPN applications may often be installed on a computer (e.g., user device), though some entities may provide a purpose-built VPN application as a hardware device that is pre-installed with software to enable the VPN. Typically, a VPN application may utilize one or more VPN protocols to encrypt and decrypt the communicated data. Some commonly used VPN protocols may include OpenVPN, SSTP, PPTP, L2TP/IPsec, SSL/TLS, Wireguard, IKEv2, and SoftEther.

Data communication over a network (e.g., Internet) may be susceptible to a cybercrime. Such data communication may involve communication of private information and/or sensitive data. A malicious party may perpetrate the cybercrime in an attempt to steal, alter, disable, expose, or destroy the private information and/or sensitive data through unauthorized access to the communicating user devices. A cybercrime may include, for example, a malware attack, a phishing attack, a ransomware attack, a virus attack, etc. As a result, cyber security measures may be used to prevent occurrence of the cybercrime and/or to mitigate risks associated with the cybercrime.

SUMMARY

In one aspect, the present disclosure contemplates a method including determining, by a virtual private network (VPN) server having established VPN connections with one or more user devices, aggregate amounts of VPN data communicated with a host device (e.g., a target server) during sample durations of time within a reference period; determining, by the VPN server, difference amounts indicating differences in the aggregate amounts of VPN data communicated with the host device during successive sample durations of time; determining, by the VPN server, average aggregate amounts of VPN data communicated with the host device based at least in part on averaging the difference amounts; determining, by the VPN server, a largest average aggregate amount, from among the average aggregate amounts, as an average threshold level; and selectively transmitting, by the VPN server, a notification to the one or more devices indicating that the one or more user devices is to manage transmission of data from the one or more user devices based at least in part on a result of comparing the average threshold level with an observed average aggregate amount of VPN data communicated with the host device during an operation period.

In another aspect, the present disclosure contemplates a VPN server, the VPN server comprising a memory; and a processor communicatively coupled to the memory, the processor being configured to: determine, while having established VPN connections with one or more user devices, aggregate amounts of VPN data communicated with a host device during sample durations of time within a reference period; determine difference amounts indicating differences in the aggregate amounts of VPN data communicated with the host device during successive sample durations of time; determine average aggregate amounts of VPN data communicated with the host device based at least in part on averaging the difference amounts; determine a largest average aggregate amount, from among the average aggregate amounts, as an average threshold level; and selectively transmit a notification to the one or more devices indicating that the one or more user devices is to manage transmission of data from the one or more user devices based at least in part on a result of comparing the average threshold level with an observed average aggregate amount of VPN data communicated with the host device during an operation period.

In another aspect, the present disclosure contemplates a non-transitory computer readable medium storing instructions, which when executed by a processor associated with a VPN server, cause the processor to: determine, while having established VPN connections with one or more user devices, aggregate amounts of VPN data communicated with a host device during sample durations of time within a reference period; determine difference amounts indicating differences in the aggregate amounts of VPN data communicated with the host device during successive sample durations of time; determine average aggregate amounts of VPN data communicated with the host device based at least in part on averaging the difference amounts; determine a largest average aggregate amount, from among the average aggregate amounts, as an average threshold level; and selectively transmit a notification to the one or more devices indicating that the one or more user devices is to manage transmission of data from the one or more user devices based at least in part on a result of comparing the average threshold level with an observed average aggregate amount of VPN data communicated with the host device during an operation period.

It is to be understood that both the foregoing general description and the following detailed description are exemplary and explanatory in nature and are intended to provide an understanding of the present disclosure without limiting the scope thereof. In that regard, additional aspects, features, and advantages of the present disclosure will be apparent to one skilled in the art from the following detailed description.

BRIEF DESCRIPTION OF THE DRAWINGS

The accompanying drawings illustrate aspects of systems, devices, methods, and/or mediums disclosed herein and together with the description, serve to explain the principles of the present disclosure. Throughout this description, like elements, in whatever aspect described, refer to common elements wherever referred to and referenced by the same reference number. The characteristics, attributes, functions, interrelations ascribed to a particular element in one location apply to those elements when referred to by the same reference number in another location unless specifically stated otherwise.

The figures referenced below are drawn for ease of explanation of the basic teachings of the present disclosure; the extensions of the figures with respect to number, position, relationship, and dimensions of the parts to form the following aspects may be explained or may be within the skill of the art after the following description has been read and understood. Further, exact dimensions and dimensional proportions to conform to specific force, weight, strength, and similar requirements will likewise be within the skill of the art after the following description has been read and understood.

The following is a brief description of each figure used to describe the present disclosure, and thus, is being presented for illustrative purposes only and should not be limitative of the scope of the present disclosure.

Figure 1:
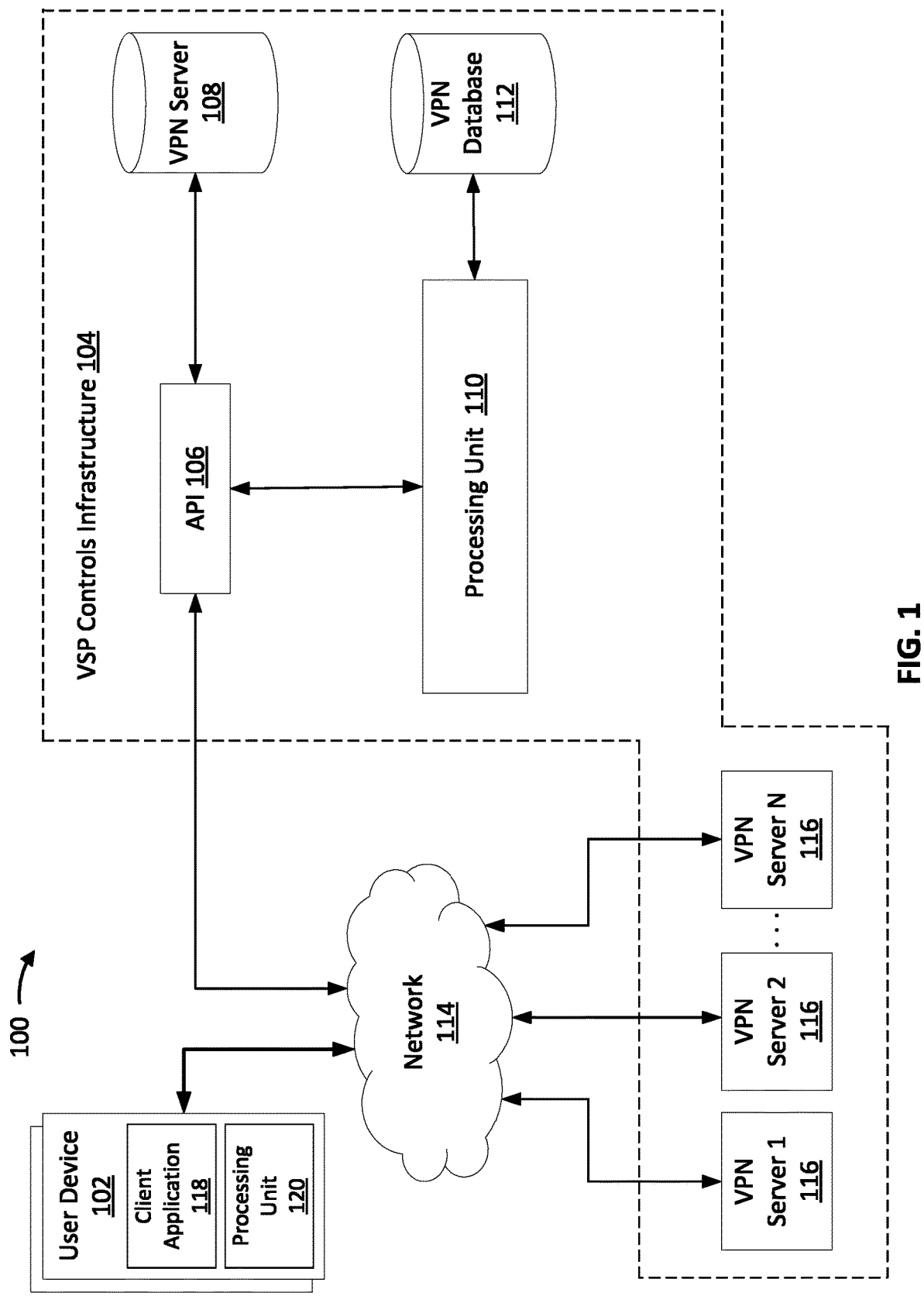

FIG. 1 is an illustration of an example system associated with managing data communication in a VPN, according to various aspects of the present disclosure.

Figure 2:
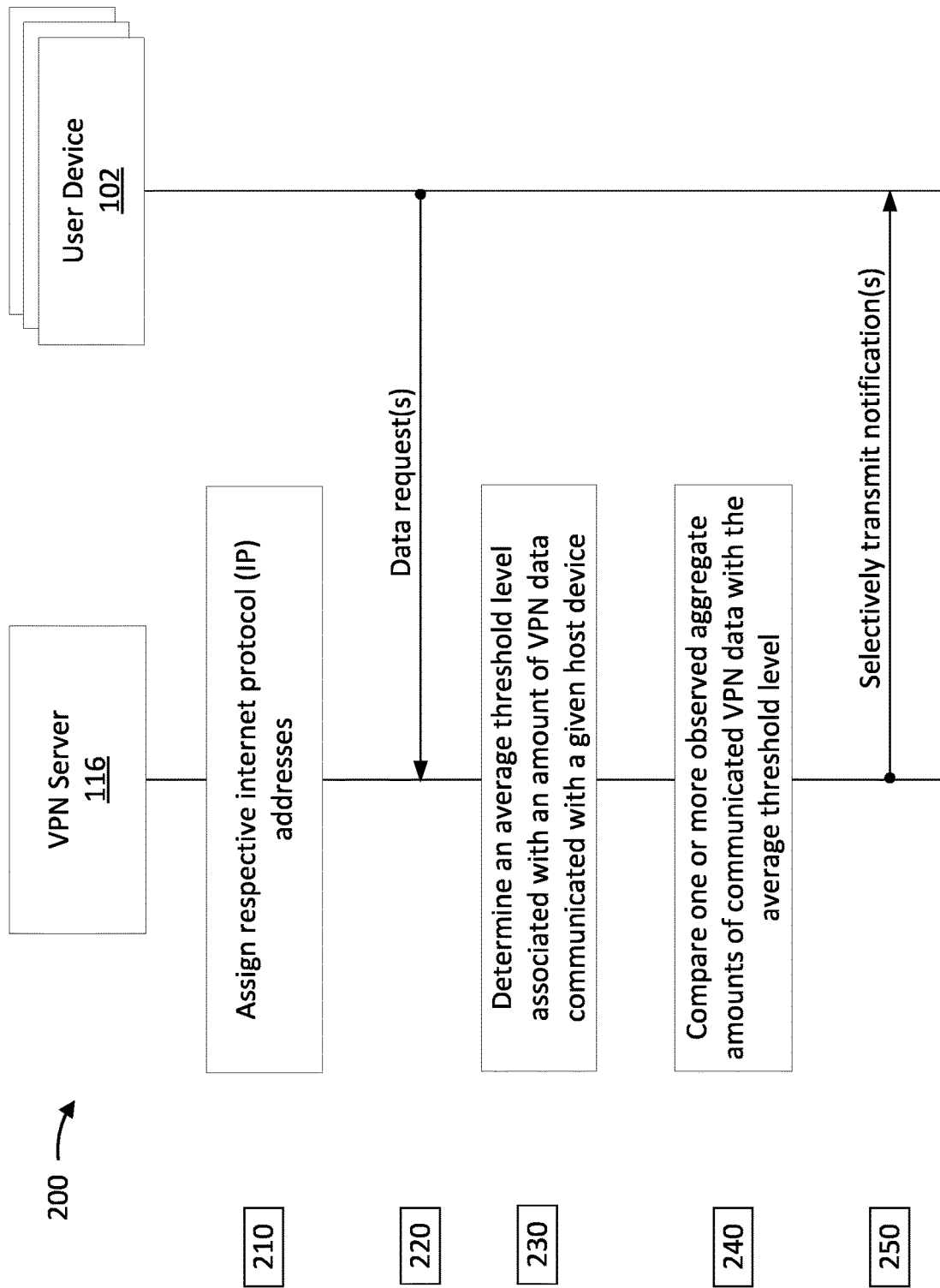

FIG. 2 is an illustration of an example flow associated with managing data communication in a VPN, according to various aspects of the present disclosure.

Figure 3:
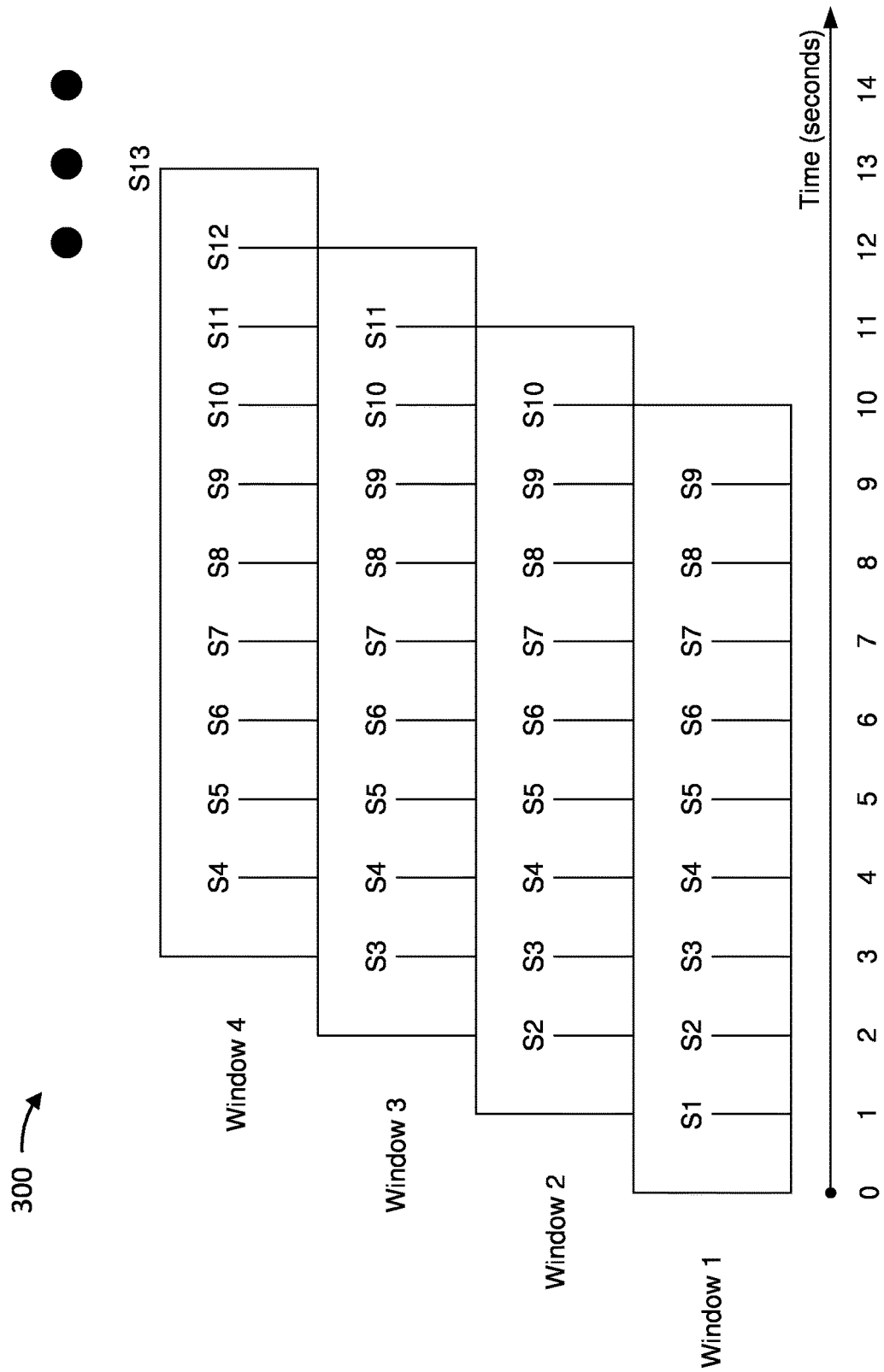

FIG. 3 is an illustration of an example associated with managing data communication in a VPN, according to various aspects of the present disclosure.

Figure 4:
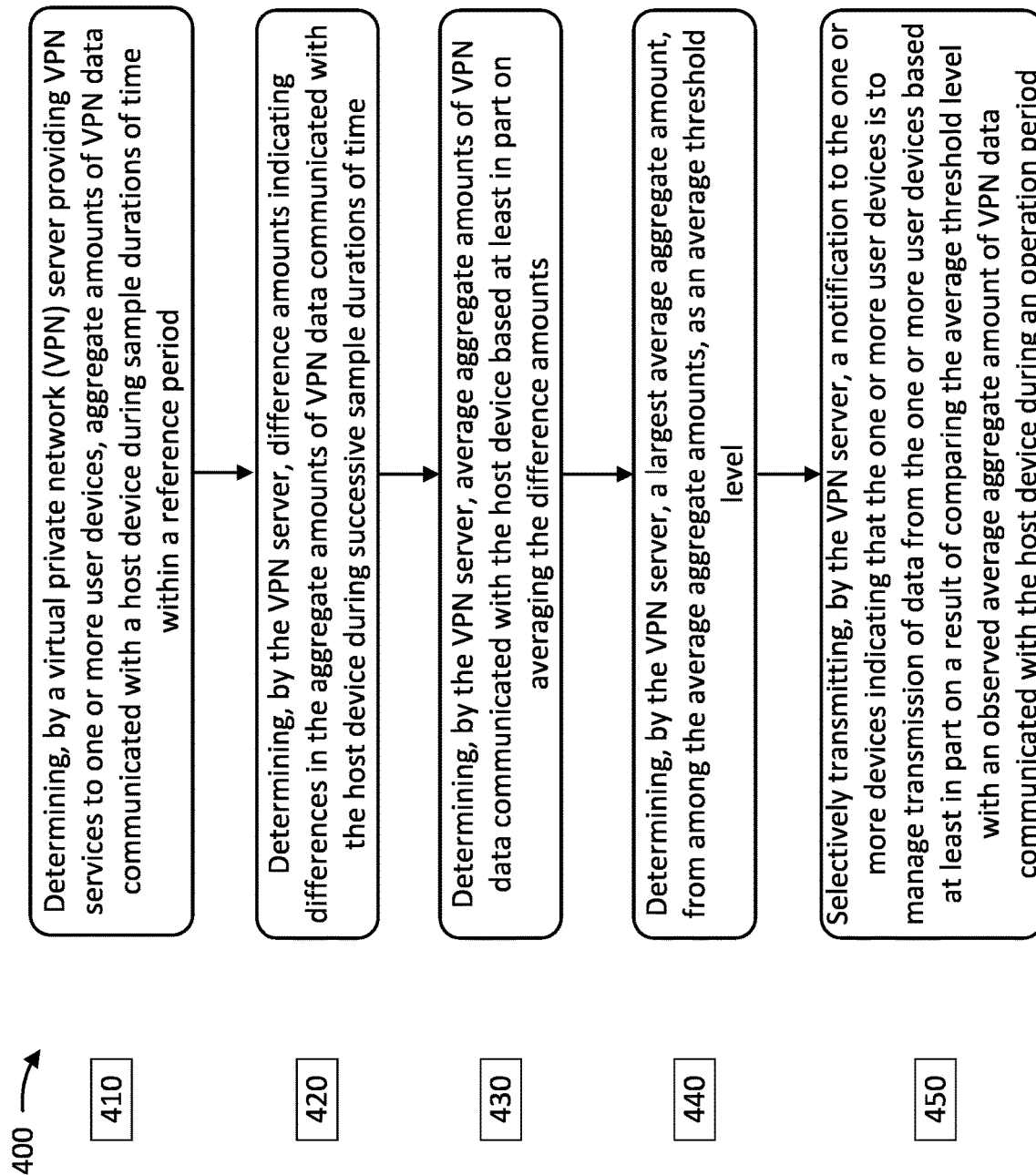

FIG. 4 is an illustration of an example process associated with managing data communication in a VPN, according to various aspects of the present disclosure.

Figure 5:
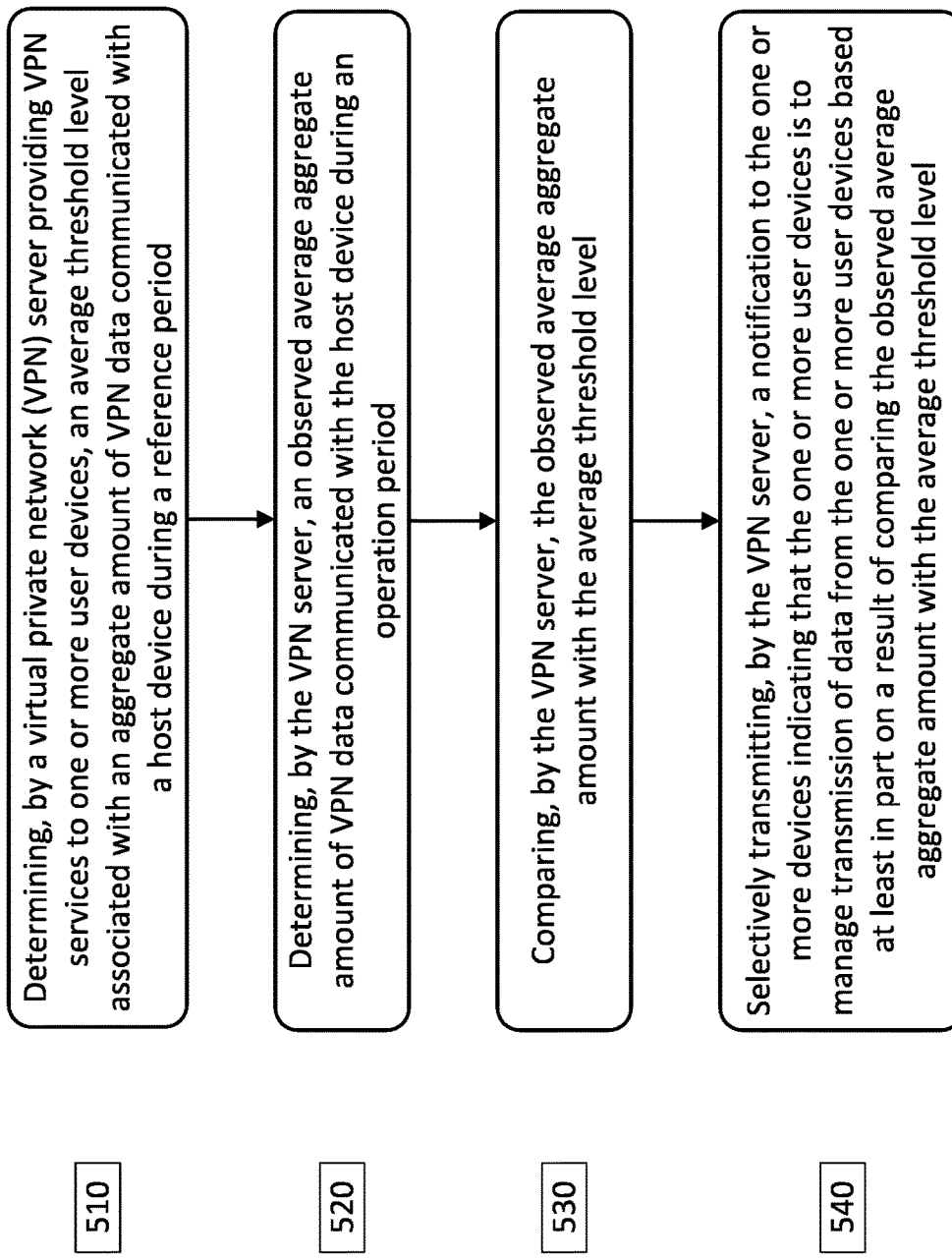

FIG. 5 is an illustration of an example process associated with managing data communication in a VPN, according to various aspects of the present disclosure.

Figure 6:
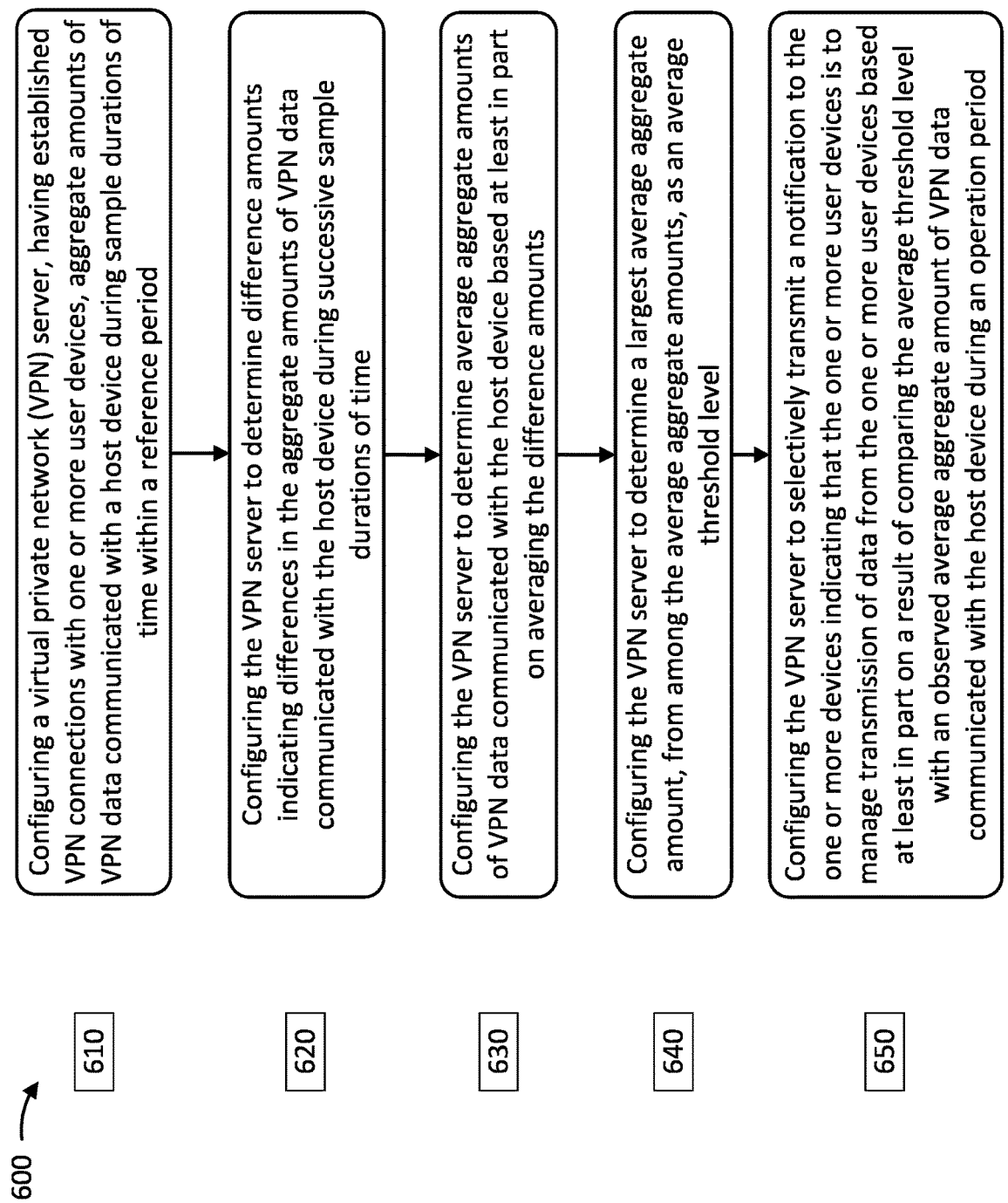

FIG. 6 is an illustration of an example process associated with managing data communication in a VPN, according to various aspects of the present disclosure.

Figure 7:
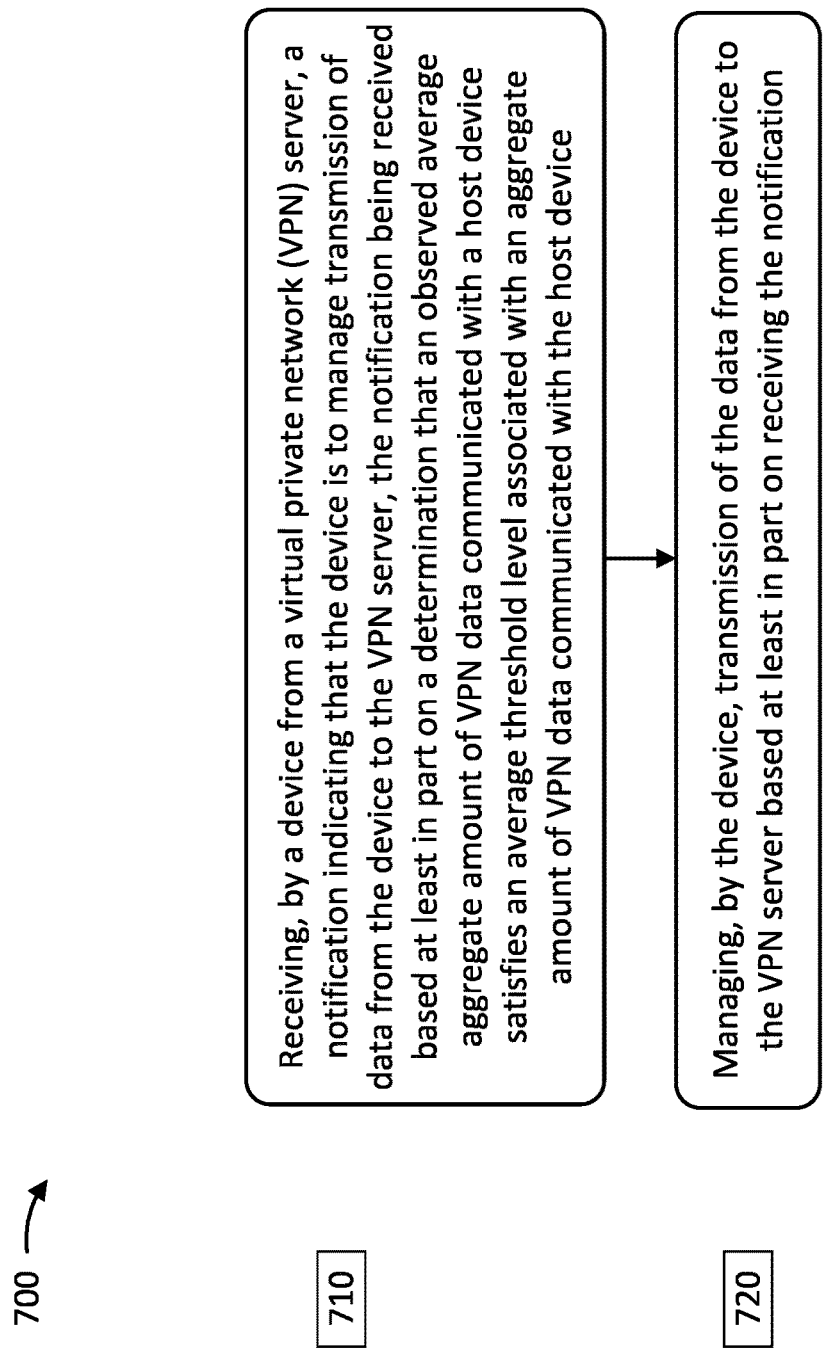

FIG. 7 is an illustration of an example process associated with managing data communication in a VPN, according to various aspects of the present disclosure.

Figure 8:
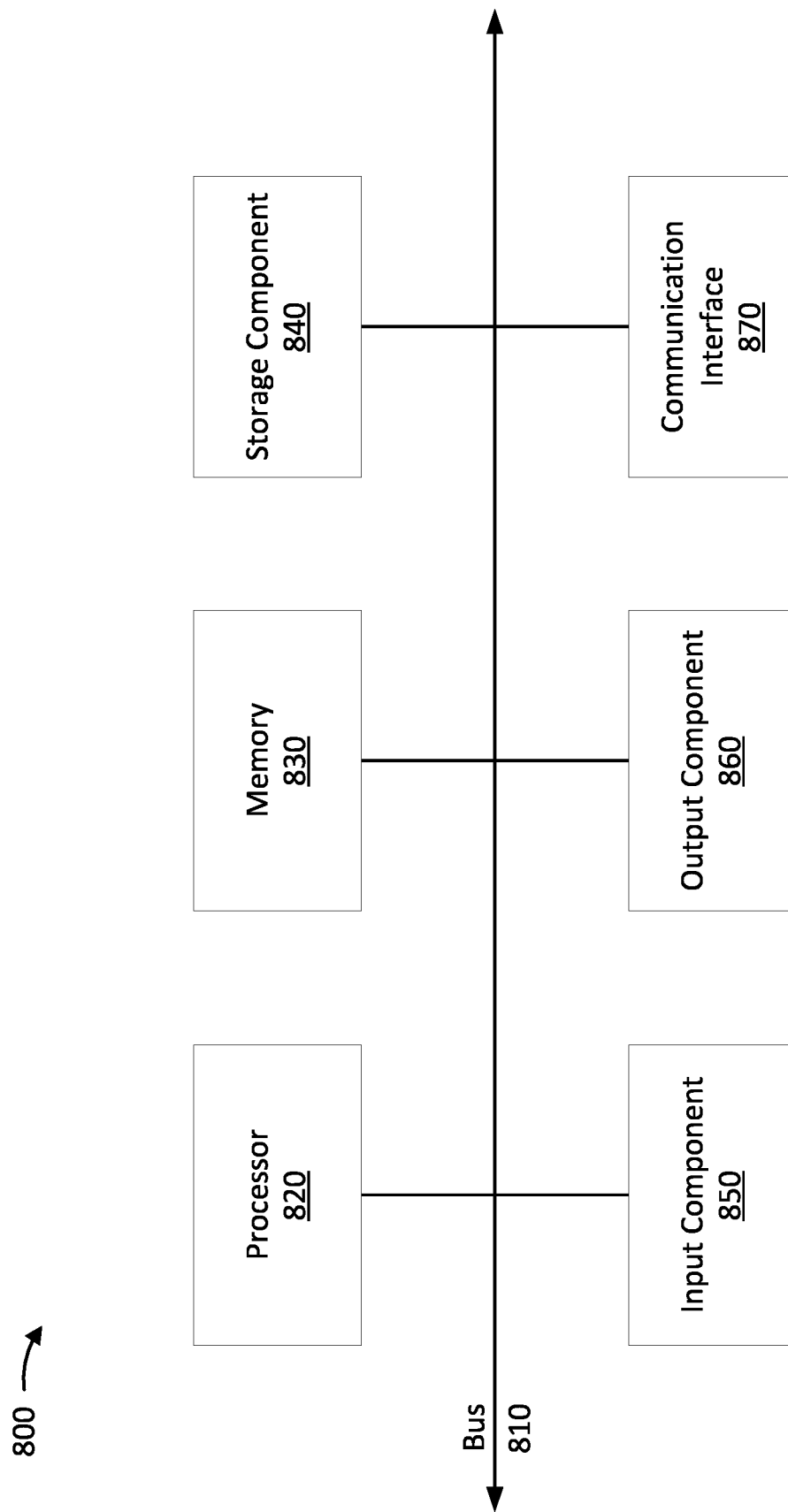

FIG. 8 is an illustration of example devices associated with managing data communication in a VPN, according to various aspects of the present disclosure.

DETAILED DESCRIPTION

For the purposes of promoting an understanding of the principles of the present disclosure, reference will now be made to the aspects illustrated in the drawings, and specific language may be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one aspect may be combined with the features, components, and/or steps described with respect to other aspects of the present disclosure. For the sake of brevity, however, the numerous iterations of these combinations may not be described separately. For simplicity, in some instances the same reference numbers are used throughout the drawings to refer to the same or like parts.

FIG. 1 is an illustration of an example system 100 associated with managing data communication in a VPN, according to various aspects of the present disclosure. Example 100 shows an architectural depiction of components included in system 100. In some aspects, the components may include one or more user devices 102 capable of communicating with a VPN service provider (VSP) control infrastructure 104 and with one or more VPN servers 116 over a network 114. The VSP control infrastructure 104 may be owned and operated by a VPN service provider and may include an application programming interface (API) 106, a user database 108, a processing unit 110, a VPN database 112, and the one or more VPN servers 116. As shown in FIG. 1, the API 106 may be capable of communicating with the user database 108 and with the processing unit 110. Additionally, the processing unit 110 may be capable of communicating with the VPN database 112, which may be capable of communicating with a testing module (not shown). The testing module may be capable of communicating with the one or more VPN servers 116 over the network 114. The processing unit 110 may be capable of configuring operation of the one or more VPN servers 116.

The user device 102 may be a physical computing device capable of hosting a VPN application and of connecting to the network 114. The user device 102 may be, for example, a laptop, a mobile phone, a tablet computer, a desktop computer, a smart device, a router, or the like. In some aspects, the user device 102 may include, for example, Internet-of-Things (IoT) devices such as VSP smart home appliances, smart home security systems, autonomous vehicles, smart health monitors, smart factory equipment, wireless inventory trackers, biometric cyber security scanners, or the like. The network 114 may be any digital telecommunication network that permits several nodes to share and access resources. In some aspects, the network 114 may include one or more of, for example, a local-area network (LAN), a wide-area network (WAN), a campus-area network (CAN), a metropolitan-area network (MAN), a home-area network (HAN), Internet, Intranet, Extranet, and Internetwork. In some aspects, a user device 102 may utilize a processing unit 120 and/or a client application 118, which is provided by the MSP control infrastructure 104, to communicate with the API 106.

The VSP control infrastructure 104 may include a combination of hardware and software components that enable provision of VPN services to the user device 102. The VSP control infrastructure 104 may interface with (the VPN application on) the user device 102 via the API 106, which may include one or more endpoints to a defined request-response message system. In some aspects, the API 106 may be configured to receive, via the network 114, a connection request from the user device 102 to establish a VPN connection with a VPN server 116. The connection request may include an authentication request to authenticate the user device 102 and/or a request for an IP address of an optimal VPN server for establishment of the VPN connection therewith. In some aspects, an optimal VPN server may be a single VPN server 116 or a combination of one or more VPN servers 116. The API 106 may receive the authentication request and the request for an IP address of an optimal VPN server in a single connection request. In some aspects, the API 106 may receive the authentication request and the request for an IP address of an optimal VPN server in separate connection requests.

The API 106 may further be configured to handle the connection request by mediating the authentication request. For instance, the API 106 may receive from the user device 102 credentials including, for example, a unique combination of a user ID and password for purposes of authenticating the user device 102. In another example, the credentials may include a unique validation code known to an authentic user. The API 106 may provide the received credentials to the user database 108 for verification.

The user database 108 may include a structured repository of valid credentials belonging to authentic users. In one example, the structured repository may include one or more tables containing valid unique combinations of user IDs and passwords belonging to authentic users. In another example, the structured repository may include one or more tables containing valid unique validation codes associated with authentic users. The VPN service provider may add or delete such valid unique combinations of user IDs and passwords from the structured repository at any time. Based at least in part on receiving the credentials from the API 106, the user database 108 and a processor (e.g., the processing unit 110 or another local or remote processor) may verify the received credentials by matching the received credentials with the valid credentials stored in the structured repository. In some aspects, the user database 108 and the processor may authenticate the user device 102 when the received credentials match at least one of the valid credentials. In this case, the VPN service provider may provide VPN services to the user device 102. When the received credentials fail to match at least one of the valid credentials, the user database 108 and the processor may fail to authenticate the user device 102. In this case, the VPN service provider may decline to provide VPN services to the user device 102.

When the user device 102 is authenticated, the user device 102 may initiate a VPN connection and may transmit to the API 106 a request for an IP address of an optimal VPN server. The processing unit 110 included in the VSP control infrastructure may be configured to determine/identify a single VPN server 116 as the optimal server or a list of VPN servers. The processing unit 110 may utilize the API 106 to transmit the IP address of the optimal server or IP addresses of the VPN servers 116 included in the list to the user device 102. In the case where the list of IP addresses of the VPN servers 116 is provided, the user device 102 may have an option to select a single VPN server 116 from among the listed VPN servers as the optimal server 116. The user device 102 may transmit an initiation request to establish a VPN connection (e.g., an encrypted tunnel) with the optimal VPN server. In some aspects, the optimal VPN server with which the user device establishes the encrypted tunnel may be referred to as a primary VPN server or an entry VPN server. In some aspects, a VPN server 116 may be a piece of physical or virtual computer hardware and/or software capable of securely communicating with (the VPN application on) the user device 102 for provision of VPN services.

The processing unit 110 may be a logical unit including a scoring engine. The processing unit 110 may include a logical component configured to perform complex operations to compute numerical weights related to various factors associated with the VPN servers 116. The scoring engine may likewise include a logical component configured to perform arithmetical and logical operations to compute a server penalty score for one or more of the VPN servers 116. In some aspects, based at least in part on server penalty scores calculated via the complex operations and/or the arithmetical and logical operations, the processing unit 110 may determine an optimal VPN server. In one example, the processing unit 110 may determine the VPN server 116 with the lowest server penalty score as the optimal VPN server. In another example, the processing unit 110 may determine the list of optimal VPN servers by including, for example, three (or any number of) VPN servers 116 with the three lowest server penalty scores.

One or more components (e.g., API 106, user database 108, processing unit 110, VPN database 112, and/or VPN servers 116) included in the VSP control infrastructure 104 may further be associated with a controller/processor, a memory, a communication interface, or a combination thereof (e.g., FIG. 6). For instance, the one or more components may include or may be included in a controller/processor, a memory, or a combination thereof. In some aspects, the one or more components included in the VSP control infrastructure 104 may be separate and distinct from each other. Alternatively, in some aspects, the one or more components included in the VSP control infrastructure 104 may be combined with one or more of the other components included in the VSP control infrastructure 104. In some aspects, the one or more components included in the VSP control infrastructure 104 may be local with respect to each other. Alternatively, in some aspects, the one or more of the components included in the VSP control infrastructure 104 may be located remotely with respect to one or more of the other components included in the VSP control infrastructure 104. Additionally, or alternatively, the one or more components included in the VSP control infrastructure 104 may be implemented at least in part as software stored in a memory. For example, a component (or a portion of a component) may be implemented as instructions or code stored in a non-transitory computer-readable medium and executable by a controller or a processor to perform the functions or operations of the component. Additionally, or alternatively, a set of the one or more components shown in FIG. 1 may be configured to perform one or more functions described as being performed by another one of the one or more components shown in FIG. 1.

As indicated above, FIG. 1 is provided as an example. Other examples may differ from what is described with regard to FIG. 1.

User devices may request VPN services from a VSP control infrastructure. To request the VPN services, as discussed above with respect to FIG. 1, a user device may transmit a connection request and/or an authentication request to an API associated with the VSP control infrastructure. The user device may undergo an authentication process involving the API and a database associated with the VSP control infrastructure. Once authenticated, the VSP control infrastructure may determine a VPN server for providing the VPN services to the user device. The user device may transmit an initiation request for establishing a VPN connection with the VPN server.

Once the VPN connection is established, the VSP control infrastructure may provide VPN services to the user device via the VPN server. Providing the VPN services may include configuring the VPN server to securely communicate (e.g., transmit and/or receive) VPN data associated with the user device. In some aspects, the VPN data may include, for example, a data request received from the user device and/or data of interest obtained by the VPN server from one or more host devices based at least in part on receiving the data request. In some aspects, the VSP control infrastructure may configure the VPN server to provide the VPN services to multiple user devices having respective VPN connections with the VPN server.

While the VPN server is providing the VPN services, one or more user devices from among the multiple user devices may be affected by malware. For instance, a malicious party may install malware on the one or more user devices without knowledge of the one or more user devices. Further, the malicious party may utilize the malware to launch, for example, a distributed denial-of-service (DDoS) attack on a given host device that provides the data of interest requested by the one or more user devices. In some aspects, the malicious party may utilize the malware to cause the one or more devices to transmit superfluous data requests via the VPN server in an attempt to launch the DDoS attack and to overload the given host device. In this case, the user device may inefficiently expend user device resources (e.g., processing resources, memory resources, power consumption resources, battery life, or the like) and the VSP control infrastructure may inefficiently expend VPN resources (computational resources, network bandwidth, management resources, processing resources, memory resources, or the like) regarding communication of the superfluous data requests and/or related VPN data.

Based at least in part on receiving a threshold amount of such superfluous data requests from the VPN server, the given host device may determine that the VSP control infrastructure and/or the VPN server is associated with launching the DDoS attack on the given host device. As a result, the given host device may suspend receipt of data requests from all VPN servers associated with the VSP control infrastructure. Further, the given host may blacklist the all VPN servers associated with the VSP control infra- structure such that a VPN server associated with the VSP control infrastructure may not communicate with the given host device. Consequently, the VSP control infrastructure may be unable to provide the VPN services to the one or more user devices communicating the superfluous data requests and/or other user devices from among the multiple user devices communicating legitimate data requests. In this case, business interests of the VPN service provider may be adversely affected. Further, the one or more user devices and/or the other user devices may inefficiently expend user device resources (e.g., processing resources, memory resources, power consumption resources, battery life, or the like) to prepare and transmit the superfluous data requests and the VSP control infrastructure may inefficiently expend VPN resources (computational resources, network bandwidth, management resources, processing resources, memory resources, or the like) to connect with the given host device in an attempt to fulfill the superfluous data requests and/or the legitimate data requests received from the multiple user devices.

Additionally, because the VSP control infrastructure may fail to provide the VPN services to the multiple user devices via the VPN server, the multiple user devices may disconnect the established VPN connections and re-establish new VPN connections with a new VPN server. Such disconnecting of the established VPN connections and establishing of the new VPN connections may inefficiently consume user device resources (e.g., processing resources, memory resources, power consumption resources, battery life, or the like) and VPN resources (computational resources, network bandwidth, management resources, processing resources, memory resources, or the like) that can otherwise be utilized to perform more suitable tasks associated with the VPN.

Various aspects of systems and techniques discussed in the present disclosure enable managing data communication in a VPN. In some aspects, a VSP control infrastructure may configure a VPN server to establish respective VPN connections with multiple user devices and to provide VPN services to the multiple user devices. Further, the VSP control infrastructure may configure the user devices, by providing a client application, to receive the VPN services from the VPN server. The VPN services may include the VPN server communicating (e.g., transmitting and/or receiving) VPN data. In an example, the VPN server may receive the data requests from the multiple user devices and may obtain and provide the data of interest from host devices to the multiple user devices. In some aspects, during a reference period, the VPN server may determine an average threshold level associated with VPN data communicated with a given host device (e.g., communicated VPN data). Further, while providing the VPN services during an operation period, the VPN server may determine an observed aggregate amount of VPN data communicated with the given host device. The VPN server may compare the observed aggregate amount with the average threshold level, and may manage data communication with the multiple user devices based at least in part on a result of comparing the observed average with the average threshold level. In an example, when the observed aggregate amount satisfies the average threshold level, the VPN server may determine that a user device, from the multiple user devices, is affected with malware such that the user device is transmitting superfluous data requests. In this case, the VPN server may selectively notify (the client application associated with) the user device. The client application associated with the user device may manage (e.g., limit) the data requests transmitted by the user device. In this way, the VSP control infrastructure may configure the VPN server and/or the user device to mitigate risks associated with the user device transmitting superfluous data requests and/or overloading the given host device, with the VSP control infrastructure being blacklisted, and/or with the user devices having to disconnect and re-establish VPN connections. As a result, the VSP control infrastructure may enable conservation and efficient utilization of user device resources (e.g., processing resources, memory resources, power consumption resources, battery life, or the like) and resources associated with the VPN (computational resources, network bandwidth, management resources, processing resources, memory resources, or the like) for more suitable tasks associated with the VPN.

In some aspects, a processor (e.g., processor 820, etc.) associated with a VPN server may determine, while having established VPN connections with one or more user devices, aggregate amounts of VPN data communicated with a host device during sample durations of time within a reference period; determine difference amounts indicating differences in the aggregate amounts of VPN data communicated with the host device during successive sample durations of time; determine average aggregate amounts of VPN data communicated with the host device based at least in part on averaging the difference amounts; determine a largest average aggregate amount, from among the average aggregate amounts, as an average threshold level; and selectively transmit a notification to the one or more devices indicating that the one or more user devices is to manage transmission of data from the one or more user devices based at least in part on a result of comparing the average threshold level with an observed average aggregate amount of VPN data communicated with the host device during an operation period.

FIG. 2 is an illustration of an example flow 200 associated with managing data communication in a VPN, according to various aspects of the present disclosure. FIG. 2 shows a VPN server 116 in communication with multiple user devices 102. In some aspects, the VPN server 116 and the multiple user devices 102 may communicate over a network (e.g., network 114). In some aspects, the multiple user devices 102 may utilize respectively installed client applications to communicate with an API (e.g., API 106) associated with the VSP control infrastructure 104. As discussed with respect to FIG. 1, the VSP control infrastructure 104 may authenticate the multiple user devices 102 and may enable the multiple user devices 102 to establish respective VPN connections with the VPN server 116. Further, the VSP control infrastructure 104 may configure the VPN server 116 and/or the multiple user devices to manage data communication in the VPN, as discussed herein.

The multiple user devices 102 may install respective client applications (e.g., client application 118), the respective client applications being associated with (e.g., provided by) the VSP control infrastructure 104. The user devices 102 may utilize the respective client applications to communicate with the API 106 and/or a processor (e.g., processing unit 110, processor 820) associated with the VSP control infrastructure 104. In some aspects, the respective client applications may enable the user devices to receive information to be processed by the client applications and/or by the VSP control infrastructure 104. Each of the client applications may include respective graphical user interfaces to receive the information via local input interfaces (e.g., touch screen, keyboard, mouse, pointer, etc.) associated with the user devices. The information may be received via text input or via a selection from among a plurality of options (e.g., pull down menu, etc.). In some aspects, a client application may activate and/or enable, at an appropriate time, the graphical interface for receiving the information. In an example, the client application may cause a screen (e.g., local screen) associated with a user device to display, for example, a visual message (e.g., pop-up message) to request entry of the information. In another example, the client application may cause a sound system (e.g., speaker, etc.) associated with the user device to sound, for example, an audible message to request entry of the information. Further, the client application may enable transmission of at least a portion of the information to the VSP control infrastructure 104. In some aspects, the client application may utilize a first processing unit (e.g., processing unit 120, processor 820) associated with the user device to perform processes/operations associated with obtaining the VPN services and/or managing data communication in the VPN.

As shown by reference numeral 210, the VPN server 116 may assign respective exit internet protocol (IP) addresses to the multiple user devices 102 based at least in part on the respective VPN connections being established. In an example, for a first user device 102, the VPN server 116 may assign a first exit IP address, for a second user device 102, the VPN server may assign a second exit IP address, and so on. In some aspects, the VSP control infrastructure 104 (e.g., processing unit 110) may configure the VPN server 116 to select exit IP addresses randomly from a list of exit IP addresses available to the VPN server 116 or to select exit IP addresses sequentially from the list of exit IP addresses available to the VPN server 116. Based at least in part on assigning the respective exit IP addresses to the user devices 102, the VPN server 116 may store a correlation between the user devices 102 with the respectively assigned exit IP addresses in a connection tracking table. In some aspects, there can be different mereological configurations of exit IPs addresses and sets (pools) of exit IP addresses that are available to the VPN server 116.

In some aspects, the VPN server 116 may monitor and/or measure an amount of data communicated via the respectively assigned exit IP addresses. Further, as discussed elsewhere herein, the VPN server 116 may manage an amount of data communicated via one or more exit IP addresses, from among the respectively assigned exit IP addresses, based at least in part on the monitoring and/or measuring of the amount of data communicated.

While providing the VPN services to the multiple user devices during the established VPN connections, as shown by reference numeral 220, the VPN server 116 may receive data requests from the multiple user devices 102. In some aspects, a communication interface (e.g., communication interface 870) in association with other components of the VPN server 116 and/or the VSP control infrastructure 104 may receive the data requests from the multiple user devices 102.

In an example, the VPN server 116 may receive one or more first data requests from the first user device 102. The one or more first data requests may request the VPN server 116 to retrieve first data of interest that is hosted by one or more host devices and to provide the first data of interest to the first user device 102. In some aspects, the first user device may transmit the one or more first data requests based at least in part on utilizing one or more first communication applications (e.g., web browser) installed on the first user device 102.

Based at least in part on receiving the one or more first data requests, the VPN server 116 may process the one or more first data requests. In an example, the VPN server 116 may utilize the first exit IP address, assigned to the first user device 102, to query the one or more host devices and to retrieve the requested first data of interest. Based at least in part on retrieving the first data of interest, the VPN server 116 may utilize a correlation between the first user device 102 and the first exit IP address to route (e.g., transmit) the retrieved first data of interest to the user device 102. In some aspects, the correlation between the first user device 102 and the first exit IP address may be privately or internally stored within the VPN server 116 in, for example, the connection tracking table. The VPN server 116 may inspect the connection tracking table to determine the routing of the retrieved first data of interest. In some aspects, the correlation between the first user device 102 and the first exit IP address may indicate to the VPN server 116 that the first data of interest, retrieved utilizing the first exit IP address, is to be routed to the first user device 102, which transmitted the one or more first data requests to the VPN server 116.

In a similar and/or analogous manner, the VPN server 116 may receive and process one or more second data requests received from the second user device 102, one or more third data requests received from a third user device 102, and so on.

As shown by reference numeral 230, the VPN server 116 may determine an average threshold level associated with an amount of VPN data communicated with a given (e.g., particular) host device. In some aspects, the communicated VPN data may include data associated with communication of data requests received from one or more user devices 102 for requesting data of interest from the given host device. In some aspects, the VPN data may include the data of interest retrieved by the VPN server 116 from the given host device and routed to the one or more user devices 102.

The VPN server 116 may determine the average threshold level for communicated VPN data during a reference period (e.g., reference hour, reference day, reference week, reference month, etc.). The reference period may be associated with a period of time when the multiple user devices 102 may be known to operate normally and/or when none of the multiple user devices 102 may be affected by malware. In this way, the multiple user devices 102 may transmit legitimate data requests (as opposed to superfluous data requests) during the reference period.

To determine the average threshold level, the VPN server 116 may determine windows of time (e.g., 10 seconds, 30 seconds, 60 seconds, 90 seconds, etc.) in the reference period. In some aspects, one or more windows of time (e.g., intervals of time) may at least partially overlap with each other. For a window of time, the VPN server 116 may determine aggregate amounts of communicated VPN data in association with samples, such that a sample indicates a total amount of communicated VPN data during a sample duration of time. In an example, a first aggregate amount of communicated VPN data may indicate a total amount of VPN data communicated with the given host device during a first sample duration of time, a second aggregate amount of communicated VPN data may indicate a total amount of VPN data communicated with the given host device during a second sample duration of time, a third aggregate amount of communicated VPN data may indicate a total amount of VPN data communicated with the given host device during a third sample duration of time, and so on.

In some aspects, an aggregate amount of VPN data may indicate a total amount of VPN data communicated with the given host device. The VPN server 116 may determine the aggregate amount of VPN data based at least in part on measuring and totaling amounts of VPN data communicated with the given host device. In some aspects, as discussed previously, the VPN server 116 may utilize monitoring of data communicated in association with assigned exit IP addresses to measure and total the amounts of VPN data communicated with the given host device.

The VPN server may determine respective average amounts of aggregate data communicated with the given host device for the windows of time (e.g., Window 1, Window 2, Window 3, Window 4, and so on) included in the reference period. As seen in example 300 of FIG. 3, a window of time may have a time interval of, for example, 10 seconds and the one or more windows of time may at least partially overlap with each other. In example 300, Window 1 may have a time interval from 0 to 10 seconds, Window 2 may have a time interval from 1 to 11 seconds, Window 3 may have a time interval from 2 to 12 seconds, Window 4 may have a time interval from 3 to 13 seconds, and so on.

For a window of time, the VPN server 116 may determine samples (e.g., S1, S2, S3, . . . , S13), a sample indicating an aggregate amount of VPN data communicated with the given host device during a sample duration of time (e.g., 1 second) associated with each sample. For instance, sample S1 may indicate the aggregate amount of VPN data communicated with the given host device during a first sample duration from 0 seconds to 1 second, sample S2 may indicate the aggregate amount of VPN data communicated with the given host device during a second sample duration from 1 second to 2 seconds, sample S3 may indicate the aggregate amount of VPN data communicated with the given host device during a third sample duration from 2 seconds to 3 seconds, . . . , sample S13 indicate the aggregate amount of VPN data communicated with the given host device during a thirteenth sample duration from 12 seconds to 13 seconds, and so on.

Based at least in part on determining the samples, the VPN server 116 may determine, for a window of time, an average aggregate amount of VPN data communicated with the given host device (e.g., communicated VPN data). In an example, for Window 1, the VPN server 116 may determine difference amounts indicating differences in the aggregate amounts of communicated VPN data with respect to successive samples. For instance, for Window 1, the VPN server may determine difference amounts D1, D2, . . . , D9. In this case, the first difference amount D1 may indicate a first difference (e.g., S2−S1) in the aggregate amount of communicated VPN data between the first sample duration (e.g., 0 seconds to 1 second) and the second sample duration (e.g., 1 second to 2 seconds); the second difference amount D2 may indicate a second difference (e.g., S3−S2) in the aggregate amount of communicated VPN data between the second sample duration (e.g., 1 second to 2 seconds) and the third sample duration (e.g., 2 seconds to 3 seconds); . . . ; and the ninth difference amount D10 may indicate a ninth difference (e.g., S10−S9) in the aggregate amount of communicated VPN data between the ninth sample duration (e.g., 8 seconds to 9 seconds) and the tenth sample duration (e.g., 9 seconds to 10 seconds).

Based at least in part on determining the difference amounts (e.g., D1, D2, . . . , D9), the VPN server 116 may determine a first average aggregate amount (AV1) of communicated VPN data associated with (e.g., during) Window 1 based at least in part on averaging the difference amounts (e.g., D1, D2, . . . , D9). In this case, the first average aggregate amount (AV1) may be calculated as ((D1+D2+ . . . +D9)/9). In a similar and/or analogous manner, the VPN server 116 may determine a second average aggregate amount (AV2) of communicated VPN data associated with Window 2 based at least in part on averaging the difference amounts (e.g., D2, D3, . . . , D11). In this case, the second average aggregate amount (AV2) may be calculated as ((D2+D3+ . . . +D10)/9). In a similar and/or analogous manner, the VPN server 116 may determine a third average aggregate amount (AV3) of communicated VPN data associated with Window 3 based at least in part on averaging the difference amounts (e.g., D3, D4, . . . , D11). In this case, the third average aggregate amount (AV3) may be calculated as ((D3+D4+ . . . +D11)/9). In a similar and/or analogous manner, the VPN server 116 may determine a fourth average aggregate amount (AV4) of communicated VPN data associated with Window 4 based at least in part on averaging the difference amounts (e.g., D4, D5, . . . , D12). In this case, the fourth average aggregate amount (AV4) may be calculated as ((D4+D5+ . . . +D12)/9), and so on.

Based at least in part on determining the average aggregate amounts (e.g., AV1, AV2, AV3, AV4, and so on) for windows of time in the reference period, the VPN server 116 may determine the average threshold level associated with the reference period. In an example, the VPN server 116 may compare the determined average aggregate amounts to determine the largest average aggregate amount. Further, the VPN server 116 may determine the largest average aggregate amount to be the average threshold level.

In some aspects, the VPN server 116 may determine the average threshold level periodically. For instance, the VPN server 116 may periodically repeat performance of the above processes to determine the average threshold level during another reference period.

As shown by reference numeral 240, the VPN server 116 may compare one or more observed aggregate amounts of communicated VPN data with the average threshold level (e.g., block 230). For instance, at an end of the reference period, the VPN server 116 may commence providing the VPN services to the multiple user devices 102 during an operation period. In some aspects, one or more user devices 102 from among the multiple user devices 102 may get affected with malware during the operation period, and may transmit superfluous data requests.

During the operation period, the VPN server 116 may determine observed aggregate amounts of VPN data communicated with the given host device. In some aspects, the VPN server 116 may determine the observed aggregate amounts in a similar and/or analogous manner as determining the aggregate amounts discussed above (e.g., block 230).

In an example, the VPN server 116 may determine the observed aggregate amounts for windows of time (e.g., 10 seconds, 30 seconds, 60 seconds, 90 seconds, etc.) in the operation period. In some aspects, similar to the reference period, one or more windows of time may at least partially overlap with each other in the operation period. For a window of time, the VPN server 116 may determine observed aggregate amounts of communicated VPN data in association with samples, such that a sample indicates a total amount of communicated VPN data during a sample duration of time. In an example, a first observed aggregate amount of communicated VPN data may indicate an observed total amount of VPN data communicated with the given host device during a first sample duration of time, a second observed aggregate amount of communicated VPN data may indicate an observed total amount of VPN data communicated with the given host device during a second sample duration of time, a third observed aggregate amount of communicated VPN data may indicate an observed total amount of VPN data communicated with the given host device during a third sample duration of time, and so on.

In some aspects, an observed aggregate amount of VPN data may indicate a total amount of VPN data communicated with the given host device. The VPN server 116 may determine the observed aggregate amount of VPN data based at least in part on measuring and totaling amounts of VPN data communicated with the given host device. In some aspects, as discussed previously, the VPN server 116 may utilize monitoring of data communicated in association with assigned exit IP addresses to measure and total the amounts of VPN data communicated with the given host device.

For instance, similar to example 300 of FIG. 3, the VPN server may determine respective observed average amounts of aggregate data communicated with the given host device for the windows of time (e.g., Window 1, Window 2, Window 3, Window 4, and so on) included in the operation period. A window of time may have a time interval of, for example, 10 seconds and the one or more windows of time may at least partially overlap with each other. Similar to example 300, Window 1 may have a time interval from 0 to 10 seconds, Window 2 may have a time interval from 1 to 11 seconds, Window 3 have a time interval from 2 to 12 seconds, Window 4 may have a time interval from 3 to 13 seconds, and so on.

For a window of time, the VPN server 116 may determine samples (e.g., S1, S2, S3, . . . , S13), a sample indicating an observed aggregate amount of VPN data communicated with the given host device during a sample duration of time (e.g., 1 second) associated with the sample. For instance, sample S1 may indicate an observed aggregate amount of VPN data communicated with the host device during a first sample duration from 0 seconds to 1 second, sample S2 may indicate an observed aggregate amount of VPN data communicated with the given host device during a second sample duration from 1 second to 2 seconds, sample S3 may indicate an observed aggregate amount of VPN data communicated with the given host device during a third sample duration from 2 seconds to 3 seconds, . . . , sample S13 indicate an observed aggregate amount of VPN data communicated with the given host device during a thirteenth sample duration from 12 seconds to 13 seconds, and so on.

Based at least in part on determining the samples, the VPN server 116 may determine, for a window, an average observed aggregate amount of VPN data communicated with the given host device (e.g., communicated VPN data). In an example, for Window 1, the VPN server 116 may determine observed difference amounts indicating differences in the observed aggregate amounts of communicated VPN data with respect to successive samples. For instance, for Window 1, the VPN server may determine observed difference amounts OD1, OD2, . . . , OD9. In this case, the first observed difference amount OD1 may indicate a first difference (e.g., S2–S1) in the observed aggregate amount of communicated VPN data between the first sample duration (e.g., 0 seconds to 1 second) and the second sample duration (e.g., 1 second to 2 seconds); the second observed difference amount OD2 may indicate a second difference (e.g., S3–S2) in the observed aggregate amount of communicated VPN data between the second sample duration (e.g., 1 second to 2 seconds) and the third sample duration (e.g., 2 seconds to 3 seconds); . . . ; and the ninth observed difference amount OD9 may indicate a ninth difference (e.g., S10–S9) in the observed aggregate amount of communicated VPN data between the ninth sample duration (e.g., 8 seconds to 9 seconds) and the tenth sample duration (e.g., 9 seconds to 10 seconds).

Based at least in part on determining the observed difference amounts (e.g., OD1, OD2, . . . , OD9), the VPN server 116 may determine a first observed average aggregate amount (OAV1) of communicated VPN data associated with Window 1 based at least in part on averaging the observed difference amounts (e.g., OD1, OD2, . . . , OD9). In this case, the first observed average aggregate amount (OAV1) may be calculated as ((OD1+OD2+ . . . +OD9)/9). In a similar and/or analogous manner, the VPN server 116 may determine a second observed average aggregate amount (OAV2) of communicated VPN data associated with Window 2 based at least in part on averaging the observed difference amounts (e.g., OD2, OD3, . . . , OD10). In this case, the second observed average aggregate amount (OAV2) may be calculated as ((OD2+OD3+ . . . +OD10)/9). In a similar and/or analogous manner, the VPN server 116 may determine a third average aggregate amount (OAV3) of communicated VPN data associated with Window 3 based at least in part on averaging the observed difference amounts (e.g., OD3, OD4, . . . , OD11). In this case, the third observed average aggregate amount (OAV3) may be calculated as ((OD3+OD4+ . . . +OD11)/9). In a similar and/or analogous manner, the VPN server 116 may determine a fourth observed average aggregate amount (OAV4) of communicated VPN data associated with Window 4 based at least in part on averaging the observed difference amounts (e.g., OD4, OD5, . . . , OD12). In this case, the fourth observed average aggregate amount (OAV4) may be calculated as ((OD4+OD5+ . . . +OD12)/9), and so on.

Based at least in part on determining the first observed average aggregate amount (OAV1) of communicated VPN data, as shown by reference numeral 240, the VPN server 116 may compare the first observed aggregate amount (OAV1) with the average threshold level (e.g., block 230).

When the VPN server 116 determines that the first observed average aggregate amount (OAV1) satisfies the average threshold level (e.g., the first observed aggregate amount (OAV1) is equal to or greater than the average threshold level), the VPN server 116 may determine that one or more user devices 102 (from among the multiple user devices 102) may be affected by malware and/or may be transmitting superfluous data requests to request data of interest from the given host device.

In this case, as shown by reference numeral 250, the VPN server 116 may select to transmit respective notifications to the one or more user devices 102 indicating that the one or more user devices 102 is transmitting superfluous data requests and/or that an observed average aggregate amount satisfies the average threshold level and/or that the one or more user devices 102 is to manage transmission of data requests (e.g., manage data communication in the VPN). Such respective notifications may be received by the respective client applications associated with the one or more user devices 102. Based at least in part on receiving the notification, a respective client application may assist in managing the data communication in the VPN. For instance, the respective client application may intercept all data requests to be transmitted from the respective user device 102. In an example, the respective client application may suspend transmission of a data request from the respective user device 102 by, for example, discarding the intercepted data request. In another example, the respective client application may suspend transmission of a data request (without discarding the data request) and cause the respective user device to deliver an audible and/or visual message to notify a user of the respective user device that transmission of data from the user device to the VPN server suspended and/or that the respective user device is transmitting superfluous data requests. In some aspects, the message may identify the host device to enable determination as to whether the respective user device intended to transmit a data request to the identified host device. The message may also include options (e.g., digital button, audio prompt acceptance, etc.) to enable the respective client application to process the intercepted data request. An option may include instructing the respective client application to forward the intercepted data request to the VPN server 116. Another option may include instructing the respective client application to discard the intercepted data request based at least in part on determining that the intercepted data request is a superfluous data request. In some aspects, the respective client application may start an option timer based at least in part on delivering the audible and/or visual message. At an expiration of the timer, if an option is not selected, the respective client application may discard the intercepted data request.

Alternatively, when the VPN server 116 determines that the first observed aggregate amount (OAV1) fails to satisfy the average threshold level (e.g., first observed aggregate amount (OAV1) is less than the average threshold level), the VPN server 116 may select to continue communicating the VPN data associated with the given host device.

In this case, the VPN server 116 may compare the second observed aggregate amount (OAV2) of communicated VPN data with the average threshold level. When the VPN server 116 determines that second observed aggregate amount (OAV2) satisfies the average threshold level (e.g., second observed aggregate amount (OAV2) is equal to or greater than the average threshold level), the VPN server 116 may determine that one or more user devices 102 may be affected with malware and/or transmitting superfluous data requests to request data of interest from the given host device.

In this case, the VPN server 116 may select to transmit respective notifications to the one or more user devices 102 indicating that the one or more user devices 102 is transmitting superfluous data requests. Such respective notifications may be received by the respective client applications associated with the one or more user devices 102. Based at least in part on receiving the notification, a respective client application may assist in managing the data communication in the VPN. For instance, the respective client application may intercept all data requests to be transmitted from the respective user device 102. In an example, the respective client application may suspend transmission of a data request from the respective user device 102 by, for example, discarding the intercepted data request. In another example, the respective client application may suspend transmission of a data request (without discarding the data request) and cause the respective user device to deliver an audible and/or visual message to notify a user of the respective user device that the respective user device is transmitting superfluous data requests. In some aspects, the message may identify the host device to enable determination as to whether the respective user device intended to transmit a data request to the identified host device. The message may also include options (e.g., digital button, audio prompt acceptance, etc.) to enable the respective client application to process the intercepted data request. An option may include instructing the respective client application to forward the intercepted data request to the VPN server 116. Another option may include instructing the respective client application to discard the intercepted data request based at least in part on determining that the intercepted data request is a superfluous data request. In some aspects, the respective client application may start an option timer based at least in part on delivering the audible and/or visual message. At an expiration of the timer, if an option is not selected, the respective client application may discard the intercepted data request.

Alternatively, when the VPN server 116 determines that the second observed aggregate amount (OAV2) fails to satisfy the average threshold level (e.g., second observed aggregate amount (OAV2) is less than the average threshold level), the VPN server 116 may select to continue communicating the VPN data associated with the given host device. Further, the VPN server 116 may compare the third observed change in the aggregate amount of communicated VPN data with the average threshold level, and so on.

In this way, by managing an amount of communicated data requests and/or the amount of communicated VPN data based at least in part on comparing the observed aggregate amount with the average threshold level, the VPN server and/or the respective client applications may mitigate risks associated with the user device transmitting superfluous data requests and/or overloading the given host device, with the VSP control infrastructure being blacklisted, and/or with the user devices having to disconnect and re-establish VPN connections. As a result, the VSP control infrastructure may enable conservation and efficient utilization of user device resources (e.g., processing resources, memory resources, power consumption resources, battery life, or the like) and resources associated with the VPN (computational resources, network bandwidth, management resources, processing resources, memory resources, or the like) for more suitable tasks associated with the VPN.

As indicated above, FIGS. 2 and 3 are provided as an example. Other examples may differ from what is described with regard to FIGS. 2 and 3.

FIG. 4 is an illustration of an example process 400 associated with managing data communication in a VPN, according to various aspects of the present disclosure. In some aspects, the process 400 may be performed by a processor/controller (e.g., processor 820) associated with a VPN server (e.g., VPN server 116). As shown by reference numeral 410, process 400 includes determining, by a virtual private network (VPN) server providing VPN services to one or more user devices, aggregate amounts of VPN data communicated with a host device during sample durations of time within a reference period. For instance, the VPN server may determine, while providing VPN services to multiple user devices, aggregate amounts of VPN data communicated with a host device during sample durations of time within a reference period, as discussed elsewhere herein.

As shown by reference numeral 420, process 400 includes determining, by the VPN server, difference amounts indicating differences in the aggregate amounts of VPN data communicated with the host device during successive sample durations of time. For instance, the VPN server may utilize the associated processor/controller to determine difference amounts indicating differences in the aggregate amounts of VPN data communicated with the host device during successive sample durations of time, as discussed elsewhere herein.

As shown by reference numeral 430, process 400 includes determining, by the VPN server, average aggregate amounts of VPN data communicated with the host device based at least in part on averaging the difference amounts. For instance, the VPN server may utilize the associated processor/controller to determine average aggregate amounts of VPN data communicated with the host device based at least in part on averaging the difference amounts, as discussed elsewhere herein.

As shown by reference numeral 440, process 400 includes determining, by the VPN server, a largest average aggregate amount, from among the average aggregate amounts, as an average threshold level. For instance, the VPN server may utilize the associated processor/controller to determine a largest average aggregate amount, from among the average aggregate amounts, as an average threshold level, as discussed elsewhere herein.

As shown by reference numeral 450, process 400 includes selectively transmitting, by the VPN server, a notification to the one or more devices indicating that the one or more user devices is to manage transmission of data from the one or more user devices based at least in part on a result of comparing the average threshold level with an observed average aggregate amount of VPN data communicated with the host device during an operation period. For instance, the VPN server may utilize an associated communication interface (e.g., communication interface 870) the associated processor/controller to selectively transmit, by the VPN server, a notification to the one or more devices indicating that the one or more user devices is to manage transmission of data from the one or more user devices based at least in part on a result of comparing the average threshold level with an observed average aggregate amount of VPN data communicated with the host device during an operation period, as discussed elsewhere herein.

Process 400 may include additional aspects, such as any single aspect or any combination of aspects described below and/or in connection with one or more other processes described elsewhere herein.

In a first aspect, in process 400, determining the aggregate amounts of VPN data includes aggregating amounts of VPN data communicated with the host device via exit Internet protocol (IP) addresses assigned to the one or more user devices.

In a second aspect, alone or in combination with the first aspect, in process 400, the aggregate amounts of VPN data communicated with the host device during the sample durations of time indicate a total amount of VPN data communicated with the host device during the sample durations of time.

In a third aspect, alone or in combination with the first through second aspects, in process 400, determining the largest average aggregate amount as the average threshold level includes periodically determining the largest average aggregate amount as the average threshold level.

In a fourth aspect, alone or in combination with the first through third aspects, in process 400, the VPN data includes data of interest requested by the one or more user devices and retrieved from the host device by the VPN server.

In a fifth aspect, alone or in combination with the first through fourth aspects, in process 400, selectively transmitting the notification includes transmitting the notification when the result indicates that the observed average aggregate amount of VPN data satisfies the average threshold level.

In a sixth aspect, alone or in combination with the first through fifth aspects, process 400 may include determining that a superfluous data request is received from the one or more user devices.

Although FIG. 4 shows example blocks of the process, in some aspects, the process may include additional blocks, fewer blocks, different blocks, or differently arranged blocks than those depicted in FIG. 4. Additionally, or alternatively, two or more of the blocks of the process may be performed in parallel.

As indicated above, FIG. 4 is provided as an example. Other examples may differ from what is described with regard to FIG. 4.

FIG. 5 is an illustration of an example process 500 associated with managing data communication in a VPN, according to various aspects of the present disclosure. In some aspects, the process 500 may be performed by a processor/controller (e.g., processor 820) associated with a VPN server (e.g., VPN server 116). As shown by reference numeral 510, process 500 includes determining, by a virtual private network (VPN) server providing VPN services to one or more user devices, an average threshold level associated with an aggregate amount of VPN data communicated with a host device during a reference period. For instance, the VPN server may determine, while providing VPN services to multiple user devices, an average threshold level associated with an aggregate amount of VPN data communicated with a host device during a reference period, as discussed elsewhere herein.

As shown by reference numeral 520, process 500 includes determining, by the VPN server, an observed average aggregate amount of VPN data communicated with the host device during an operation period. For instance, the VPN server may utilize the associated processor/controller to determine an observed average aggregate amount of VPN data communicated with the host device during an operation period, as discussed elsewhere herein.

As shown by reference numeral 530, process 500 includes comparing, by the VPN server, the observed average aggregate amount with the average threshold level. For instance, the VPN server may utilize the associated processor/controller to compare the observed average aggregate amount with the average threshold level, as discussed elsewhere herein.

As shown by reference numeral 540, process 500 includes selectively transmitting, by the VPN server, a notification to the one or more devices indicating that the one or more user devices is to manage transmission of data from the one or more user devices based at least in part on a result of comparing the observed average aggregate amount with the average threshold level. For instance, the VPN server may utilize an associated communication interface (e.g., communication interface 870) with the associated processor/controller to selectively transmit a notification to the one or more devices indicating that the one or more user devices is to manage transmission of data from the one or more user devices based at least in part on a result of comparing the observed average aggregate amount with the average threshold level, as discussed elsewhere herein.

Process 500 may include additional aspects, such as any single aspect or any combination of aspects described below and/or in connection with one or more other processes described elsewhere herein.

In a first aspect, in process 500, determining the average threshold level includes determining aggregate amounts of VPN data communicated with the host device during sample durations of time.

In a second aspect, alone or in combination with the first aspect, in process 500, determining the average threshold level includes determining difference amounts indicating differences in aggregate amounts of VPN data communicated with the host device during successive sample durations of time.

In a third aspect, alone or in combination with the first through second aspects, in process 500, determining the average threshold level includes determining average aggregate amounts of VPN data communicated with the host device, the average aggregate amounts being determined based at least in part on averaging difference amounts indicating differences in aggregate amounts of VPN data communicated with the host device.

In a fourth aspect, alone or in combination with the first through third aspects, in process 500, determining the average threshold level includes comparing average aggregate amounts of VPN data communicated with the host device, and determining a largest average aggregate amount, from among the average aggregate amounts, as the average threshold level.

In a fifth aspect, alone or in combination with the first through fourth aspects, in process 500, selectively transmitting the notification includes transmitting the notification when the result indicates that the observed average aggregate amount satisfies the average threshold level.

In a sixth aspect, alone or in combination with the first through fifth aspects, process 500 may include determining that a superfluous data request is received from the one or more user devices.

Although FIG. 5 shows example blocks of the process, in some aspects, the process may include additional blocks, fewer blocks, different blocks, or differently arranged blocks than those depicted in FIG. 5. Additionally, or alternatively, two or more of the blocks of the process may be performed in parallel.

As indicated above, FIG. 5 is provided as an example. Other examples may differ from what is described with regard to FIG. 5.

FIG. 6 is an illustration of an example process 600 associated with managing data communication in a VPN, according to various aspects of the present disclosure. In some aspects, the process 600 may be performed by a processor/controller (e.g., processing unit 110 and/or processor 620) associated with a VSP control infrastructure (e.g., VSP control infrastructure 104). As shown by reference numeral 610, process 600 includes configuring a virtual private network (VPN) server, having established VPN connections with one or more user devices, aggregate amounts of VPN data communicated with a host device during sample durations of time within a reference period. For instance, the VSP control infrastructure may utilize the associated processor to configure a virtual private network (VPN) server, having established VPN connections with one or more user devices, aggregate amounts of VPN data communicated with a host device during sample durations of time within a reference period, as discussed elsewhere herein.

As shown by reference numeral 620, process 600 includes configuring the VPN server to determine difference amounts indicating differences in the aggregate amounts of VPN data communicated with the host device during successive sample durations of time. For instance, the VSP control infrastructure may utilize the associated processor to configure the VPN server to determine difference amounts indicating differences in the aggregate amounts of VPN data communicated with the host device during successive sample durations of time, as discussed elsewhere herein.

As shown by reference numeral 630, process 600 includes configuring the VPN server to determine average aggregate amounts of VPN data communicated with the host device based at least in part on averaging the difference amounts. For instance, the VSP control infrastructure may utilize the associated processor to configure the VPN server to determine average aggregate amounts of VPN data communicated with the host device based at least in part on averaging the difference amounts, as discussed elsewhere herein.

As shown by reference numeral 640, process 600 includes configuring the VPN server to determine a largest average aggregate amount, from among the average aggregate amounts, as an average threshold level. For instance, the VSP control infrastructure may utilize the associated processor to configure the VPN server to determine a largest average aggregate amount, from among the average aggregate amounts, as an average threshold level, as discussed elsewhere herein.

As shown by reference numeral 650, process 600 includes configuring the VPN server to selectively transmit a notification to the one or more devices indicating that the one or more user devices is to manage transmission of data from the one or more user devices based at least in part on a result of comparing the average threshold level with an observed average aggregate amount of VPN data communicated with the host device during an operation period. For instance, the VSP control infrastructure may utilize the associated processor to configure the VPN server to selectively transmit a notification to the one or more devices indicating that the one or more user devices is to manage transmission of data from the one or more user devices based at least in part on a result of comparing the average threshold level with an observed average aggregate amount of VPN data communicated with the host device during an operation period, as discussed elsewhere herein.

Process 600 may include additional aspects, such as any single aspect or any combination of aspects described below and/or in connection with one or more other processes described elsewhere herein.

In a first aspect, in process 600, configuring the VPN server to determine the aggregate amounts of VPN data includes configuring the VPN server to aggregate amounts of VPN data communicated with the host device via exit Internet protocol (IP) addresses assigned to the one or more user devices.

In a second aspect, alone or in combination with the first aspect, in process 600, the aggregate amounts of VPN data communicated with the host device during the sample durations of time indicate a total amount of VPN data communicated with the host device during the sample durations of time.

In a third aspect, alone or in combination with the first through second aspects, configuring the VPN server to determine the largest average aggregate amount as the average threshold level includes configuring the VPN server to periodically determine the largest average aggregate amount as the average threshold level.

In a fourth aspect, alone or in combination with the first through third aspects, in process 600, the VPN data includes data of interest requested by the one or more user devices and retrieved from the host device by the VPN server.

In a fifth aspect, alone or in combination with the first through fourth aspects, in process 600, configuring the VPN server to selectively transmit the notification includes configuring the VPN server to transmit the notification when the result indicates that the observed average aggregate amount of VPN data satisfies the average threshold level.

In a sixth aspect, alone or in combination with the first through fifth aspects, process 600 may include determining that a superfluous data request is received from the one or more user devices.

Although FIG. 6 shows example blocks of the process, in some aspects, the process may include additional blocks, fewer blocks, different blocks, or differently arranged blocks than those depicted in FIG. 6. Additionally, or alternatively, two or more of the blocks of the process may be performed in parallel.

As indicated above, FIG. 6 is provided as an example. Other examples may differ from what is described with regard to FIG. 6.

FIG. 7 is an illustration of an example process 700 associated with managing data communication in a VPN, according to various aspects of the present disclosure. In some aspects, the process 700 may be performed by a processor/controller (e.g., processor 820) associated with a user device (e.g., user device 102) executing a client application. As shown by reference numeral 710, process 700 includes receiving, by a device from a virtual private network (VPN) server, a notification indicating that the device is to manage transmission of data from the device to the VPN server, the notification being received based at least in part on a determination that an observed average aggregate amount of VPN data communicated with a host device satisfies an average threshold level associated with an aggregate amount of VPN data communicated with the host device. For instance, the user device may utilize the associated processor/controller to receive, from a virtual private network (VPN) server, a notification indicating that the device is to manage transmission of data from the device to the VPN server, the notification being received based at least in part on a determination that an observed average aggregate amount of VPN data communicated with a host device satisfies an average threshold level associated with an aggregate amount of VPN data communicated with the host device, as discussed elsewhere herein.

As shown by reference numeral 720, process 700 includes managing, by the device, transmission of the data from the device to the VPN server based at least in part on receiving the notification. For instance, the user device may utilize the associated processor/controller to manage transmission of the data from the device to the VPN server based at least in part on receiving the notification, as discussed elsewhere herein.

Process 700 may include additional aspects, such as any single aspect or any combination of aspects described below and/or in connection with one or more other processes described elsewhere herein.

In a first aspect, in process 700, the aggregate amount of VPN data communicated with the host device includes data communicated with the host device based at least in part on transmission of the data from the device to the VPN server.

In a second aspect, alone or in combination with the first aspect, in process 700, managing transmission of the data includes intercepting a data request to be transmitted by the device to the VPN server.

In a third aspect, alone or in combination with the first through second aspects, in process 700, managing transmission of the data includes suspending transmission of a data request to be transmitted by the device to the VPN server.

In a fourth aspect, alone or in combination with the first through third aspects, in process 700, managing transmission of the data includes causing the device to deliver an audio message or a video message indicating that transmission of the data from the device to the VPN server is suspended.

In a fifth aspect, alone or in combination with the first through fourth aspects, in process 700, managing transmission of the data includes causing the device to deliver an audio message or a video message identifying the host device.

In a sixth aspect, alone or in combination with the first through fifth aspects, managing transmission of the data includes enabling the device to accept an input instructing the device to discard an intercepted transmission of the data or to transmit the intercepted transmission of the data to the VPN server.

Although FIG. 7 shows example blocks of the process, in some aspects, the process may include additional blocks, fewer blocks, different blocks, or differently arranged blocks than those depicted in FIG. 7. Additionally, or alternatively, two or more of the blocks of the process may be performed in parallel.

As indicated above, FIG. 7 is provided as an example. Other examples may differ from what is described with regard to FIG. 7.

FIG. 8 is an illustration of example devices 800, according to various aspects of the present disclosure. In some aspects, the example devices 800 may form part of or implement the systems, environments, infrastructures, components, or the like described elsewhere herein (e.g., FIG. 1 and/or FIG. 2) and may be used to perform the processes described herein. The example devices 800 may include a universal bus 810 communicatively coupling a processor 820, a memory 830, a storage component 840, an input component 850, an output component 860, and a communication interface 870.

Bus 810 may include a component that permits communication among multiple components of a device 800. Processor 820 may be implemented in hardware, firmware, and/or a combination of hardware and software. Processor 820 may take the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 820 may include one or more processors capable of being programmed to perform a function. Memory 830 may include a random access memory (RAM), a read only memory (ROM), and/or another type of dynamic or static storage device (e.g., a flash memory, a magnetic memory, and/or an optical memory) that stores information and/or instructions for use by processor 820.

Storage component 840 may store information and/or software related to the operation and use of a device 800. For example, storage component 840 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 850 may include a component that permits a device 800 to receive information, such as via user input (e.g., a touch screen display, a keyboard, a keypad, a mouse, a button, a switch, and/or a microphone). Additionally, or alternatively, input component 850 may include a component for determining location (e.g., a global positioning system (GPS) component) and/or a sensor (e.g., an accelerometer, a gyroscope, an actuator, another type of positional or environmental sensor, and/or the like). Output component 860 may include a component that provides output information from device 800 (via, for example, a display, a speaker, a haptic feedback component, an audio or visual indicator, and/or the like).

Communication interface 870 may include a transceiver-like component (e.g., a transceiver, a separate receiver, a separate transmitter, and/or the like) that enables a device 800 to communicate with other devices, such as via a wired connection, a wireless connection, or a combination of wired and wireless connections. Communication interface 870 may permit device 800 to receive information from another device and/or provide information to another device. For example, communication interface 870 may include an Ethernet interface, an optical interface, a coaxial interface, an infrared interface, a radio frequency (RF) interface, a universal serial bus (USB) interface, a Wi-Fi interface, a cellular network interface, and/or the like.

A device 800 may perform one or more processes described elsewhere herein. A device 800 may perform these processes based on processor 820 executing software instructions stored by a non-transitory computer-readable medium, such as memory 830 and/or storage component 840. As used herein, the term "computer-readable medium" may refer to a non-transitory memory device. A memory device may include memory space within a single physical storage device or memory space spread across multiple physical storage devices.

Software instructions may be read into memory 830 and/or storage component 840 from another computer-readable medium or from another device via communication interface 870. When executed, software instructions stored in memory 830 and/or storage component 840 may cause processor 820 to perform one or more processes described elsewhere herein. Additionally, or alternatively, hardware circuitry may be used in place of or in combination with software instructions to perform one or more processes described elsewhere herein. Thus, implementations described herein are not limited to any specific combination of hardware circuitry and software.

The quantity and arrangement of components shown in FIG. 8 are provided as an example. In practice, a device 800 may include additional components, fewer components, different components, or differently arranged components than those shown in FIG. 8. Additionally, or alternatively, a set of components (e.g., one or more components) of a device 800 may perform one or more functions described as being performed by another set of components of a device 800.

As indicated above, FIG. 8 is provided as an example. Other examples may differ from what is described with regard to FIG. 8.

Persons of ordinary skill in the art will appreciate that the aspects encompassed by the present disclosure are not limited to the particular exemplary aspects described herein. In that regard, although illustrative aspects have been shown and described, a wide range of modification, change, and substitution is contemplated in the foregoing disclosure. It is understood that such variations may be made to the aspects without departing from the scope of the present disclosure. Accordingly, it is appropriate that the appended claims be construed broadly and in a manner consistent with the present disclosure.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, or not equal to the threshold, among other examples, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   determining, by a virtual private network (VPN) server providing VPN services to one or more user devices, an average threshold level associated with an aggregate amount of VPN data communicated with a host device during a reference period;
   determining, by the VPN server, an observed average aggregate amount of VPN data communicated with the host device during an operation period;
   comparing, by the VPN server, the observed average aggregate amount with the average threshold level; and
   selectively transmitting, by the VPN server, a notification to the one or more user devices indicating that the one or more user devices is to manage transmission of data from the one or more user devices based at least in part on a result of comparing the observed average aggregate amount with the average threshold level, wherein determining the average threshold level includes comparing average aggregate amounts of VPN data communicated with the host device, and determining a largest average aggregate amount, from among the average aggregate amounts, as the average threshold level.

2. The method of claim 1, wherein determining the average threshold level includes determining aggregate amounts of VPN data communicated with the host device during sample durations of time.

3. The method of claim 1, wherein determining the average threshold level includes determining difference amounts indicating differences in aggregate amounts of VPN data communicated with the host device during successive sample durations of time.

4. The method of claim 1, wherein determining the average threshold level includes determining average aggregate amounts of VPN data communicated with the host device, the average aggregate amounts being determined based at least in part on averaging difference amounts indicating differences in aggregate amounts of VPN data communicated with the host device.

5. The method of claim 1, wherein determining the average threshold level includes determining the average threshold level periodically.

6. The method of claim 1, wherein selectively transmitting the notification includes transmitting the notification when the result indicates that the observed average aggregate amount satisfies the average threshold level.

7. The method of claim 1, further comprising:
determining that a superfluous data request is received from the one or more user devices.

8. A device associated with a virtual private network (VPN) server, the device comprising:
a memory; and
a processor communicatively coupled to the memory, the memory and the processor being configured to:
determine, while providing VPN services to one or more user devices, an average threshold level associated with an aggregate amount of VPN data communicated with a host device during a reference period;
determine an observed average aggregate amount of VPN data communicated with the host device during an operation period;
compare the observed average aggregate amount with the average threshold level; and
selectively transmit a notification to the one or more user devices indicating that the one or more user devices is to manage transmission of data from the one or more user devices based at least in part on a result of comparing the average threshold level with an observed average aggregate amount of VPN data communicated with the host device during an operation period, wherein
to determine the average threshold level, the memory and the processor are configured to compare average aggregate amounts of VPN data communicated with the host device, and to determine a largest average aggregate amount, from among the average aggregate amounts, as the average threshold level.

9. The device of claim 8, wherein, to determine the average threshold level, the memory and the processor are configured to determine aggregate amounts of VPN data communicated with the host device during sample durations of time.

10. The device of claim 8, wherein, to determine the average threshold level, the memory and the processor are configured to determine difference amounts indicating differences in aggregate amounts of VPN data communicated with the host device during successive sample durations of time.

11. The device of claim 8, wherein, to determine the average threshold level, the memory and the processor are configured to determine average aggregate amounts of VPN data communicated with the host device, the average aggregate amounts being determined based at least in part on averaging difference amounts indicating differences in aggregate amounts of VPN data communicated with the host device.

12. The device of claim 8, wherein, to determine the average threshold level, the memory and the processor are configured to determine the average threshold level periodically.

13. The device of claim 8, wherein, to selectively transmit the notification, the memory and the processor are configured to transmit the notification when the result indicates that the observed average aggregate amount satisfies the average threshold level.

14. The device of claim 8, wherein the memory and the processor are configured to:
determine that a superfluous data request is received from the one or more user devices.

15. A non-transitory computer-readable medium configured to store instructions, which when executed by a processor associated with a virtual private network (VPN) server, configure the processor to:
determine, while providing VPN services to one or more user devices, an average threshold level associated with an aggregate amount of VPN data communicated with a host device during a reference period;
determine an observed average aggregate amount of VPN data communicated with the host device during an operation period;
compare the observed average aggregate amount with the average threshold level; and
selectively transmit a notification to the one or more user devices indicating that the one or more user devices is to manage transmission of data from the one or more user devices based at least in part on a result of comparing the average threshold level with an observed average aggregate amount of VPN data communicated with the host device during an operation period, wherein
to determine the average threshold level, the processor is configured to compare average aggregate amounts of VPN data communicated with the host device, and to determine a largest average aggregate amount, from among the average aggregate amounts, as the average threshold level.

16. The non-transitory computer-readable medium of claim 15, wherein, to determine the average threshold level, the processor is configured to determine aggregate amounts of VPN data communicated with the host device during sample durations of time.

17. The non-transitory computer-readable medium of claim 15, wherein, to determine the average threshold level, the processor is configured to determine difference amounts indicating differences in aggregate amounts of VPN data communicated with the host device during successive sample durations of time.

18. The non-transitory computer-readable medium of claim 15, wherein, to determine the average threshold level, the processor is configured to determine average aggregate amounts of VPN data communicated with the host device, the average aggregate amounts being determined based at least in part on averaging difference amounts indicating differences in aggregate amounts of VPN data communicated with the host device.

19. The non-transitory computer-readable medium of claim 15, wherein, to determine the average threshold level, the processor is configured to determine the average threshold level periodically.

20. The non-transitory computer-readable medium of claim 15, wherein, to selectively transmit the notification, the processor is configured to transmit the notification when the result indicates that the observed average aggregate amount satisfies the average threshold level.

\* \* \* \* \*